(12) United States Patent
Patnaik et al.

(10) Patent No.: US 11,583,960 B2
(45) Date of Patent: Feb. 21, 2023

(54) HIGH TEMPERATURE CAPABLE BRAZE ASSEMBLY

(71) Applicant: Morgan Advanced Ceramics, Inc., New Bedford, MA (US)

(72) Inventors: Abhishek S. Patnaik, Lexington, MA (US); John Antalek, East Freetown, MA (US); Vishwanath Sarkar, Hayward, CA (US)

(73) Assignee: Morgan Advanced Ceramics, Inc., New Bedford, MA (US)

( * ) Notice: Subject to any disclaimer, the term of this patent is extended or adjusted under 35 U.S.C. 154(b) by 246 days.

(21) Appl. No.: 17/030,552

(22) Filed: Sep. 24, 2020

(65) Prior Publication Data

US 2021/0086312 A1    Mar. 25, 2021

Related U.S. Application Data

(60) Provisional application No. 62/905,728, filed on Sep. 25, 2019.

(51) Int. Cl.

| | | |
|---|---|---|
| B23K 35/30 | (2006.01) |
| B32B 9/00 | (2006.01) |
| B32B 9/04 | (2006.01) |
| C22C 5/02 | (2006.01) |
| B23K 1/19 | (2006.01) |
| C22C 19/03 | (2006.01) |
| B23K 103/08 | (2006.01) |
| B23K 103/00 | (2006.01) |

(52) U.S. Cl.
CPC ............ *B23K 35/3013* (2013.01); *B23K 1/19* (2013.01); *B23K 35/3033* (2013.01); *B32B 9/005* (2013.01); *B32B 9/041* (2013.01); *C22C 5/02* (2013.01); *C22C 19/03* (2013.01); *B23K 2103/08* (2018.08); *B23K 2103/52* (2018.08)

(58) Field of Classification Search
None
See application file for complete search history.

(56) References Cited

U.S. PATENT DOCUMENTS

| | | | |
|---|---|---|---|
| 4,217,137 A | 8/1980 | Kraska et al. | |
| 4,225,262 A | 9/1980 | Koop et al. | |
| 4,824,009 A * | 4/1989 | Master | H01L 21/4853 228/124.1 |
| 5,385,791 A * | 1/1995 | Mizuhara | B23K 35/3013 228/262.6 |
| 2015/0340742 A1* | 11/2015 | Kumar | B23K 35/3033 428/632 |
| 2019/0031571 A1* | 1/2019 | Sandin | C04B 35/486 |

* cited by examiner

*Primary Examiner* — Seth Dumbris
(74) *Attorney, Agent, or Firm* — Servilla Whitney LLC (57) ABSTRACT

The present invention relates to an article comprising a ceramic substrate (310) comprising a source of zirconium oxide; a metallic substrate (320); and a braze joint disposed between the ceramic substrate and the metallic substrate. The braze joint comprises (i) a gold rich phase (330) interfacing against a surface of the ceramic substrate. The gold rich phase comprises a refractory metal selected from the group consisting of molybdenum, tungsten, niobium, tantalum and combinations thereof; and (ii) a second metallic phase (340) comprising a metal selected form the group consisting of nickel, iron, vanadium, cobalt, chromium, osmium, tantalum or combinations thereof.

23 Claims, 8 Drawing Sheets

HIGH TEMPERATURE CAPABLE BRAZE ASSEMBLY

CROSS-REFERENCE TO RELATED APPLICATIONS

This application claims priority to U.S. Provisional Application Ser. No. 62/905,728 filed Sep. 25, 2019, the entire disclosure of which is hereby incorporated by reference herein.

FIELD

This disclosure relates to high temperature braze alloys, joints thereof; articles comprising said joints and the process of manufacturing said articles.

BACKGROUND

Operating temperatures in jet engines are steadily increasing in a quest for increased efficiencies which provide both an economic and environment dividend. With an increase in operating temperatures there is an emerging need for engine components to withstand these more extreme operating environments. In particular, connections between ceramic and metal components are required which can reliably operate over a wide temperature window.

The failure mechanism for joints in cyclic temperature environments tends to shift from a stress failure mechanism to a corrosion failure mechanism as the peak temperature increases. Traditionally, ceramics have been first metallised using a molybdenum-manganese process on ceramic substrate, with the formation of a glassy intergranular phase being a key factor between the ceramic and the metallisation layer. The metallisation layer then enables a braze alloy to join the metal substrate to the metallised ceramic substrate.

While the process was effective for alumina substrates, the absence of components to form the glassy intergranular phase made this process less effective on zirconia substrates. A further limitation of this process is, at higher temperatures, the metallisation layer is prone to oxidation and corrosion.

As such, there is a need for a joint which is able to bond together metal component to a ceramic component exposed to cyclic exposure to high temperatures, particularly for bonding metal to a zirconia component.

SUMMARY

In a first aspect of the present disclosure there is provided an article comprising:
a. a ceramic substrate (310) comprising a source of zirconium oxide;
b. a metallic substrate (320); and
c. a braze joint disposed between the ceramic substrate and the metallic substrate,
wherein the braze joint comprises:
(i) a gold rich phase (330) interfacing (preferably hermetically interfacing) against a surface of the ceramic substrate, said gold rich phase comprises a refractory metal selected from the group consisting of molybdenum, tungsten, niobium, tantalum and combinations thereof; and
(ii) a second metallic phase (340) comprising a metal selected form the group consisting of nickel, iron, vanadium, cobalt, chromium, osmium, tantalum or combinations thereof.

The article of the present disclosure is preferably capable of withstanding cyclic temperature testing (thermal shock test) between −65° F. (or room temperature) and 1250° F., preferably for at least 5 cycles or at least 100 cycles or at least 600 cycles. After the thermal shock test, the article preferably passes a hermeticity test (<1×10$^{-8}$ L-atm/sec He) and torque test (>70 in-b).

Ceramic Substrate

In one embodiment, the source of zirconium oxide has the formula:

$ZrO_{2-x}$ where x=0 or greater than 0.

In some embodiments, the zirconium oxide ($ZrO_{2-x}$) has a stoichiometric deficiency in oxygen (i.e. x is greater than 0). It is thought that a ceramic substrate surface comprising reduced zirconium oxide facilitates the formation of the braze joint as well as enabling the braze alloy to sufficiently wet the ceramic substrate surface during the brazing process to form a secure hermetic seal.

As described the ceramic substrate comprises a source of zirconium oxide. Additionally or alternatively, the ceramic substrate may comprise zirconium oxide.

The ceramic substrate preferably comprises at least 5 wt % $ZrO_{2-x}$ (zirconium oxide) and optionally at 20 wt % $ZrO_{2-x}$ or at least 50 wt % $ZrO_{2-x}$, or at least 70 wt % $ZrO_{2-x}$, or at least 80 wt % $ZrO_{2-x}$, or at least 90 wt % $ZrO_{2-x}$, where x=0 or greater than 0). The lower limit of zirconium oxide will be dictated by a number of factors including the braze material composition and the zirconium oxide grain size.

Zirconium oxide (also known as zirconia) is used in ceramics but, in its pure form, suffers from a tetragonal/monoclinic phase change that makes manufacture of sintered bodies of pure zirconia ceramics difficult. For this reason zirconia ceramics generally comprise other components that lock the material wholly or partially into a high temperature cubic phase or stabilise the tetragonal phase. Typical components to achieve this effect include, for example, CaO, MgO and $Y_2O_3$. Zirconium oxide based ceramics may also contain other components (e.g. hafnia, $HfO_2$).

Typical zirconium oxide containing ceramics include (among other types):
Precipitation hardened/transformation toughened ceramics such as partially stabilised zirconia (PSZ) which comprises tetragonal t-$ZrO_2$ particles and stabilised cubic c-$ZrO_2$ grains [e.g. yttria stabilized zirconia (Y-PSZ), magnesia stabilized zirconia (MSZ) and ceria stabilized zirconia (CSZ)].
Tetragonal zirconia polycrystal ceramics (TZP) which comprise fine grained tetragonal t-$ZrO_2$ particles (e.g. Y-TZP).
Zirconia toughened ceramics (ZTC) which comprise tetragonal t-$ZrO_2$ particles or monoclinic m-$ZrO_2$ particles dispersed in another ceramic material (e.g. alumina [ZTA], mullite, or spinel).

The source of zirconium oxide further may comprise yttria, magnesia, scandia, alumina, calcia and ceria. The further components may form partially stabilised, stabilised or toughened forms of zirconium oxide.

In some embodiments, the source of zirconia is selected from the group consisting of zirconia, yttria stabilised (or partially stabilised) zirconia, magnesia stabilised (or partially stabilised) zirconia, scandia stabilized (or partially stabilised) zirconia, calcia stabilised (or partially stabilised) zirconia, ceria stabilised (or partially stabilised) zirconia, zirconia toughened alumina and combinations thereof.

These modified zirconium oxides typically have improved impact, wear and chemical resistance compared to zirconium oxide.

Metallic Substrate

The metallic substrate preferably comprises or consists of one or more of titanium, aluminium, iron, nickel, molybdenum, chrome, cobalt, tungsten, carbon, vanadium, phosphorus, sulphur, silicon, niobium, copper, manganese and alloys thereof.

Gold Rich Phase

The gold rich phase preferably comprises at least 40 wt % or at least 50 wt % or at least 60 wt % or at least 70 wt % or at least 80 wt % or at least 85 wt % or at least 90 wt % or at least 95 wt % gold. The higher the gold content the greater oxidation resistance of the resultant braze joint.

In some embodiments, the gold rich phase interfaces the metallic substrate over at least 50% or at least 60% or at least 70% or at least 80% of at least 90% or at least 95% of the metallic substrate's interfacial area(s) within the braze joint (i.e. the area in contact with the braze alloy).

In some embodiments, the gold rich phase interfaces the ceramic substrate over at least 50% or at least 60% or at least 70% or at least 80% of at least 90% or at least 95% of the ceramic substrate's interfacial area within the braze joint.

The gold rich phase exhibits excellent ductility and is able to deform without cracking over wide temperature ranges to cater for different coefficients of thermal expansions between the metallic and ceramic substrates.

The gold rich phase may be a continuous phase.

Second Metallic Phase

The second metallic phase may also comprise a refractory metal (e.g. at least 2 wt % or at least 5 wt %). The second metallic phase preferably co-operates with the gold rich phase to enhance the mechanical properties of the braze joint. Preferably, the second metallic phase is a discontinuous phase dispersed within the gold rich phase.

The second metallic phase preferably comprises at least 35 wt % or at least 40 wt % or at least 50 wt % or at least 60 wt % of at least 70 wt % of at least 80 wt % of a metal selected from the group consisting of nickel, iron, vanadium, cobalt, chromium, osmium, tantalum or combinations thereof. The second metallic phase is preferably a discontinuous phase disperse with in the gold rich phase. The combination of ductility and corrosion resistance of the gold rich continuous phase and the hardness and strength of the second metallic phase (e.g. nickel rich phase) at high temperatures provide a braze joint with exceptional properties. In one embodiment, the second metallic phase is a nickel rich phase (e.g. comprises greater than 35 wt % nickel).

In some embodiments, the concentration of the gold rich phase is greater at a region of the braze joint proximal to the metallic substrate relative to a region of the braze joint distal to the metallic substrate.

In some embodiment, the concentration of the second metallic phase is greater at a region of the braze joint proximal to the ceramic substrate relative to a region of the braze joint distal to the ceramic substrate.

In some embodiments, the volumetric ratio of the gold rich phase to the second metallic phase is in the range of 20:70 to 95:5. In other embodiment, the volumetric ratio of the gold rich phase to the second metallic phase is in the range of 40:60 to 90:10 or in the range 50:50 to 80:20. The selected ratio of phases may be determined by the desired properties, the operating environment and the proportion of precursor materials required to produce the brazed joint.

For the purposes of the present disclosure, the volumetric ratio of the gold rich phase to the second metallic phase may be taken to be the same as the surface area ratio of the gold rich phase to the second metallic phase as determined by image analysis software (e.g. ImageJ™).

For the purposes of the present disclosure, the percentage of an interfacial area (2D) of the braze joint may be taken to be the same as the percentage of a cross-sectional interfacial line (1D) of the braze joint (e.g. measured from an SEM image).

The gold rich phase may comprise:
- 40 to 99 wt % gold, optionally 45 to 95 wt % or 50 to 90 wt % or 58 to 85 wt % gold or 55 to 72 wt % gold.
- 1 to 60 wt % refractory metal selected from the group consisting of molybdenum, tungsten, niobium, tantalum and combinations thereof, optionally 2 wt % to 40 wt % or 4 wt % to 20 wt % refractory metal
- 0 to 55 wt % other compounds, optionally 1 wt % to 50 wt %; or 2 wt % to 40 wt %; or 5 wt % to 30 wt % other compounds.

In some embodiments, the gold rich phase comprises a refractory metal (preferably molybdenum) in the range of 2.0 wt % to 20 wt %; or 6.0 wt % wt % to 18 wt %; or 8.0 wt % to 15 wt %.

The other compounds may comprise one or more of nickel, yttrium, cobalt, platinum, palladium, iron, manganese, chromium, zirconium, aluminium, tungsten and vanadium. In some embodiments, the vanadium content in the gold rich phase is 0.0 wt % or less than 0.2 wt % or only present as an incidental impurity.

The selection of the other compounds may be selected to influence the properties of the gold rich phase or they may be derived from precursor materials used in the formation of the brazing joint.

In some embodiments, the gold rich phase comprises nickel in the range of 5 wt % to 55 wt %, or 8 wt % to 40 wt % or 10 wt % to 30 wt %.

The gold rich phase may also comprise:
0 to 6 wt % yttrium; 0 to 7 wt % platinum; 0 to 4 wt % aluminum; 0 to 7 wt % manganese; 0 to 7 wt % chrome; 0 to 2 wt % iron; 0 to 15 wt % cobalt; and 0 to 10 wt % zirconium.

The sum of gold+refractory metals+other components is preferably at least 80 wt % or 90 wt % or 95 wt % or 99 wt % of the total weight of the braze joint. The remainder may comprise incidental impurities.

The second metallic phase may comprise: 40 wt % to 95 wt % or 50 wt % to 90 wt %; or 60 wt % to 80 wt %; or 35 wt % to 70 wt % of nickel, iron, vanadium, cobalt, chromium, osmium, tantalum, molybdenum, tungsten, niobium, tantalum or combinations thereof; 0 wt % to 40 wt % refractory metal (e.g. molybdenum, tungsten, niobium, tantalum and combinations thereof); optionally 2 wt % to 30 wt %; or 5 wt % to 20 wt %; or 15 wt % to 40 wt % refractory metal; and 0 to 40 wt % gold, optionally 2 wt % to 30 wt %; or 5 wt % to 20 wt % gold; or 10 wt % to 25 wt % gold; or 15 wt % to 40 wt % gold may also be included.

The composition of the second metallic phase is able to enhance the mechanical properties of the braze joint, whilst the gold rich phase is able to provide the required ductility for the braze joint to withstand cyclic thermal shock.

The sum of the nickel, iron, vanadium, cobalt, chromium, osmium, tantalum, molybdenum, tungsten, niobium, tantalum or combinations thereof+the refractory metal+gold may be greater than 90 wt % or greater than 95 wt % or greater than 98 wt % of the total weight of second metallic phase. In one embodiment, the second metallic phase comprises nickel. In another embodiment, the refractory metal comprises or essentially consists of molybdenum.

Preferably the second metallic phase comprises at least 60 wt % or at least 70 wt % or at least 75 wt % nickel, iron, vanadium, cobalt, chromium, osmium, tantalum, molybdenum, tungsten, niobium, tantalum or combinations thereof.

The article is preferably able to withstand at least 600 thermal shock cycles between −65° F. (−54° C.) and 1250° F. (677° C.). After the at least 5 or 100 or 600 thermal shock cycles −65° F. (or room temperature) and 1250° F., the article preferable has good hermeticity (<1×10$^{-8}$ L-atm/sec He) and passes a torque test (>70 in-b).

In a second aspect of the present disclosure, there is provided a feedthrough comprising an article as defined in the first aspect of the present disclosure.

In a third aspect of the present disclosure, there is provided a method of manufacturing an article according to the first aspect of the present disclosure, comprising the steps of:

A. Providing a ceramic substrate comprising a source of zirconium oxide;
B. Metallizing a surface of the ceramic substrate with a refractory metal selected from the group consisting of molybdenum, tungsten, niobium, tantalum and combinations thereof;
C. Optionally providing a wetting layer to the metallised ceramic substrate; said wetting layer comprising nickel, iron, vanadium, cobalt, chromium, osmium, tantalum or combinations thereof;
D. Brazing a metallic substrate to the metallised ceramic substrate with a gold rich braze material,
wherein the brazing of the metallic substrate to the ceramic substrate is conducted at a sufficient temperature and time to enable:
  the refractory metal to diffuse into the gold rich braze material to form a gold rich phase interfacing against a surface of the ceramic substrate; and
  the optional wetting layer to diffuse into the gold rich braze material to form a second metallic phase disperse within the gold rich phase.

The brazing of the metallic substrate to the ceramic substrate is preferably conducted at a sufficient temperature and time to enable the formation of a discontinuous second metallic phase disperse within a continuous gold rich phase.

The gold rich braze material preferably comprises at least 60 wt % or at least 70 wt % or at least 80 wt % or at least 90 wt % or at least 85 wt % of at least 98 wt % gold. In some embodiments, the gold rich braze is substantially pure gold (i.e. gold and incidental impurities).

The wetting layer preferably enables the gold rich braze material to better wet the metallised ceramic substrate and also provides a source of material to form the basis of the second metallic phase within the braze joint. The selection of the wetting layer components should be made with these objectives in mind. The wetting layer may comprise two or more sublayers. The outer sublayer may be chosen to enable better wetting of the metallised ceramic substrate, while the inner layer(s) may be chosen for the metal/alloy's ability to diffuse into the gold rich braze material and form the second metallic phase. The wetting layer (or sublayers thereof) preferably comprises nickel, iron, vanadium, cobalt, chromium, osmium, tantalum or combinations thereof.

In embodiments not comprising a wetting layer, the gold rich braze preferably also comprises nickel, iron, vanadium, cobalt, chromium, osmium, tantalum or combinations thereof.

The metallizing step (B) and/or brazing step (D) are preferably performed under reducing conditions such that the ceramic substrate comprises oxygen deficient zirconia (i.e. ZrO2-x where x is greater than 0).

The metallising step is preferably performed under a reducing atmosphere, such as in the presence of hydrogen at temperature typically in the range of about 1200° C. to about 1600° C. The brazing step is preferably performed under vacuum (e.g. 10$^{-4}$-10$^{-6}$ Torr). The brazing temperature will be dependent upon the gold rich braze material used, but is typically in the temperature range of 900° C. and 1100° C.

The brazing time required to enable the refractory metal to diffuse into the gold rich phase will be dependent upon the shape and dimensions of the braze joint as well as the thickness and composition of the metallisation layer as well as the presence, thickness and composition of the wetting layer. However, the brazing time of between 2 minutes and 60 minutes; and preferable between 4 minutes and 30 minutes should be sufficient in most cases. It is expected that the skilled artisan will be able to adjust the brazing parameters without unreasonable trial and error to optimise the brazing conditions to enable the metallisation and wetting layer to diffuse into the gold rich braze material to form the gold rich phase. In general, the higher brazing temperatures and increased brazing times will promote greater diffusion.

In one embodiment, the zirconium oxide based substrate may be reduced prior to the metallisation step (B). The reduction of the zirconium oxide (also known as blackened zirconia) may be achieved by firing in dry hydrogen (dew point −60° C. or better) at 1500° C. for 30 minutes and then cooled in dry hydrogen to 150° C. The use of a reduced zirconium oxide surface assists the ability of the refractory metal layer have a low oxidised state. A refractory layer substantially free of oxidised material is more readily diffused and absorbed into the gold rich braze material.

Approximating language, as used herein throughout the specification and claims, may be applied to modify any quantitative representation that could permissibly vary, without resulting in a change in the basic function to which it is related. Accordingly, a value modified by a term or terms, such as "about," is not limited to the precise value specified. In some instances, the approximating language may correspond to the precision of an instrument for measuring the value.

In the following specification and the claims, the singular forms "a", "an" and "the" include plural referents unless the context clearly dictates otherwise. As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may not be appropriate, capable, or suitable. For example, in some circumstances, an event or capacity may be expected, while in other circumstances the event or capacity may not occur.

The terms "comprising", "including" and "having" are intended to be inclusive, and mean that there may be additional elements other than the listed elements. As used herein, the term "and/or" includes any and all the combinations of one or more of the associated listed items. Unless otherwise indicated herein, the terms "disposed on", "deposited on" or "disposed between" refer to both direct contact between layers, objects, and the like, or indirect contact, e.g., having intervening layers therebetween.

As used herein, "braze" or "braze alloy composition" or "braze alloy", "braze material" or "brazing alloy" or "braze matrix", refers to a composition that has the ability to wet the components to be joined, and to seal them.

Unless otherwise stated reference to zirconia or zirconium oxide refers to $ZrO_{2-x}$ where x=0 or greater than 0. Reduced or oxygen deficient zirconia (or zirconium oxide) means $ZrO_{2-x}$ where x is greater than 0.

For the purposes of the present invention, "hermetically interfacing" means that the article passes a He leak test with a hermeticity of $<1\times10^{-8}$ L-atm/sec He.

Reference to the metallised ceramic substrate is inclusive of the ceramic substrate comprising a refractory metallised layer; and the ceramic substrate comprising a refractory metallised layer and wetting layer, when present.

DETAILED DESCRIPTION

The embodiments described herein relate to ceramic-to-metal joints. It should be understood that the embodiments are not limited to joining a ceramic component to a metal component for sealing a feedthrough, and the descriptions and figures are not limited to feedthroughs. The embodiments described herein may have various applications, for example, in sensors in turbine engines, where ceramics are used as insulators, and need to be bonded to metals.

Figure 1:
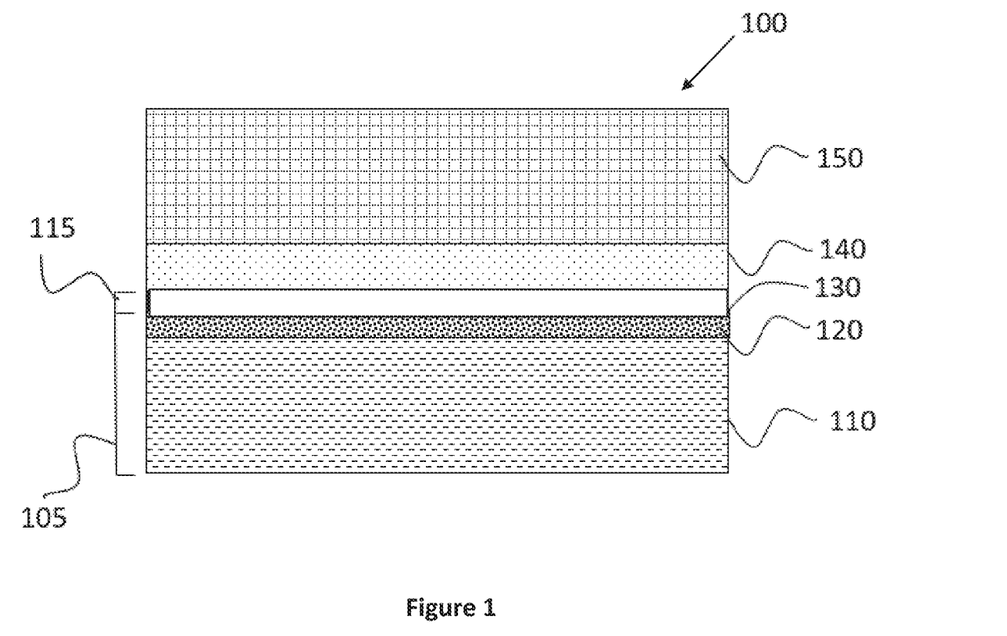
FIG. 1 is a schematic diagram of a layered join arrangement for connecting metal to a zirconia based substrate, prior to being brazed.

As illustrated in FIG. 1, the metallized ceramic component 105 includes a metallization layer 120 disposed on a surface of a ceramic component 110. In some embodiments, the metallization layer 120 is first disposed on a portion of the ceramic component 110 followed by the disposition of the wetting layer 130. As known to those skilled in the art, a metallized ceramic usually enables the bonding of the ceramic with a metal.

In one embodiment, the ceramic component 110 includes an electrically insulating ceramic. Suitable materials for the ceramic component 110 includes a source of zirconium oxide, such as zirconia, yttria stabilized zirconia, magnesia stabilised zirconia. In one embodiment, the ceramic component 110 includes yttria stabilized zirconia. A range of suitable zirconia material may be sourced from Tosoh (Japan).

Suitable metal examples for the metal component 150 include nickel, iron, copper or a combination thereof. In one embodiment, the metal component 150 includes nickel or a nickel-containing alloy, such as Inconel™ or other nickel-chromium alloy, e.g. having a nickel content of from 44 wt % to 72 wt % and a chromium content of from 3 wt % to 11 wt %. In one embodiment, the metal component 150 includes iron or a ferrous alloy, such as Fe—Cr alloy.

Metallization, generally, means coating a surface of a substrate (may be non-metallic) with a thin layer of a metal. The thin metal layer need not be continuous. The formation of a metallized ceramic typically includes coating a metal matrix on a portion of a surface of a ceramic, and then sintering the coated ceramic to a high temperature (usually greater than about 1000 degrees Celsius) under a reducing atmosphere. In certain embodiments, the metal matrix is sintered in a temperature range from about 1200° C. to about 1600° C.

In some instances, the sintering step results in the migration of a glass phase from the interior of the ceramic to the surface of the ceramic, where it fills the pores of the metal matrix while providing a glass bond to the underlying ceramic. The glass phase may also diffuse into the braze matrix as a result of the brazing process.

In one embodiment, the metallization layer 120 may include a refractory metal. Refractory metals can include niobium, molybdenum, tantalum, tungsten and rhenium; refractory metals can also include titanium, vanadium, chromium, zirconium, hafnium, ruthenium, rhodium, osmium and iridium. In one embodiment, the refractory metal includes one or more of molybdenum, tungsten, niobium, and tantalum. In one embodiment, the metallization layer 120 includes molybdenum. The amount of molybdenum may be higher than about 80 weight percent, based on the total weight of the metallization layer. In certain embodiments, the amount of molybdenum is as high as 100 weight percent. In one embodiment, the metallization layer 120 may further comprise manganese.

A variety of deposition techniques can be used for metallizing the ceramic component 110. In one embodiment, a metal matrix is first applied in the form of a layer or a coating on the surface, followed by sintering. The metal matrix can be applied by any suitable deposition technique known in the art. Non-limiting examples of the deposition techniques include a physical vapour deposition technique, screen printing, painting, and sputtering. The painting technique often includes dipping, spraying, ink printing, syringe or nozzle brushing, or tape transfer.

Before deposition, the surface of the ceramic component 110 may be polished or similarly treated, so as to remove any manufacturing damage and/or to improve the surface flatness. For example, the surface may be polished to about 15 microns ANSI/CAMI. The ceramic component 110 may further be chemically cleaned prior to the metallization, so as to remove contaminants that may affect bonding. Furthermore, the ceramic component 110 may be thermally annealed and/or calcined at an elevated temperature prior to the metallization, so as to reduce contamination, reduce residual stresses, and/or heal defects that may have been introduced into the ceramic components during preparation. However, these steps of polishing, cleaning, annealing and calcining may not be essential for producing high-quality joints; and may be used individually or in combination as per requirement.

In some embodiments, the metallization layer 120 has a thickness in a range of about 5 microns to about 100 microns. In some embodiments, the metallization layer 120 has a thickness in a range of about 10 microns to about 50 microns, and in some specific embodiments, in a range of about 20 microns to about 40 microns.

As mentioned previously, referring to FIG. 1, the wetting layer 130 is disposed, for example, plated on a surface of the metallization layer 120. As used herein, a wetting layer refers to a continuous metallic layer. The roles of the wetting layer 130 are to aid wetting of the refractory metallization layer 120 by a metal or an alloy (for example, a braze alloy) that is compatible with the metal component 150 to be joined to the ceramic component 110. Additionally, the composition of the wetting layer may also be selected as a source of material for the second metallic phase. At least the majority of the second metallic phase is preferably derived from components of the wetting layer and the gold rich braze. In some embodiments, the wetting layer may not be required, with the components of the second metallic phase being able to be derived from the gold rich braze material.

During the brazing process, the metallisation layer and wetting layer diffuse into the braze layer 140 thereby creating a gold rich continuous phase 230 and a second metallic phase 220 (FIG. 2) (e.g. a discontinuous nickel rich phase). It has been unexpectedly found that the metallisation layer (including the optional wetting layer) acts as intermediary which facilitates the wetting of the gold rich phase with the zirconia based substrate. The application of a gold rich braze directly onto the zirconia based substrate surface is unable to obtain the same bonding performance, even if the zirconia based substrate comprises reduced zirconia.

Figure 2:
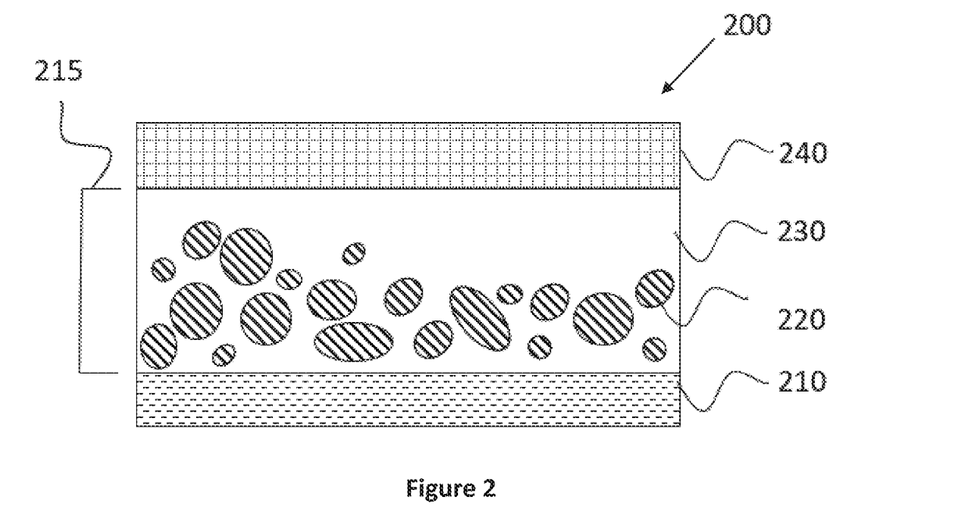
FIG. 2 is a schematic diagram of the metal-ceramic join of FIG. 1 after completion of the brazing process.

In general, a thickness of the wetting layer (e.g. nickel layer) 130 may be from about 1 micron to about 10 microns. In some embodiments, the thickness of the wetting layer 130 may be between about 2 microns and about 6 microns. In other embodiments, the thickness of the nickel layer may be up to 50 micron or 100 micron or greater, such to provide a sufficient source of nickel to transform into the second metallic phase 220 (e.g., a discontinuous nickel rich phase), in the brazed article.

The continuous gold rich phase, as well as having superior oxidation resistance, possesses good ductility which results in lower residual stress in the brazed joint since the plastic deformation of the brazing material accommodates the thermal expansion mismatch between the articles being brazed. The discontinuous phase may further enhance the mechanical properties of the joint.

The deposition of the wetting layer 130, if desired, can be carried out by any convenient method, e.g., electroplating, electroless plating, gas phase deposition, sputtering, screen printing etc. In one embodiment, the wetting layer 130 is deposited by electroplating.

After formation of the wetting layer 130, a coated ceramic component 115 (FIG. 1) (that includes the ceramic component 110; metallization layer 120; and the wetting layer 130) can be bonded to the metal component 150.

The coated ceramic component 115 is brazed to the metal component 150. Typically, "brazing" uses a braze material having a lower liquidus temperature than the melting points of the components (i.e. their materials) to be joined. The braze material is brought above its melting temperature (or liquidus temperature) while protected by a suitable atmosphere.

The gold alloy braze material of the present disclosure flows over the surface (known as wetting) of the components to be joined. Distinct from typical brazing processes, the brazing temperature and time is sufficient for the braze material to diffuse into the wetting layer 130 and the metallization layer 120.

The resultant braze joint is illustrated in FIG. 2. The brazed article 200 comprises a metal substrate 240 joined to a ceramic substrate 210 by a braze material comprising a gold rich continuous phase 230; and a second metallic phase 220 (a discontinuous phase).

Figure 7:
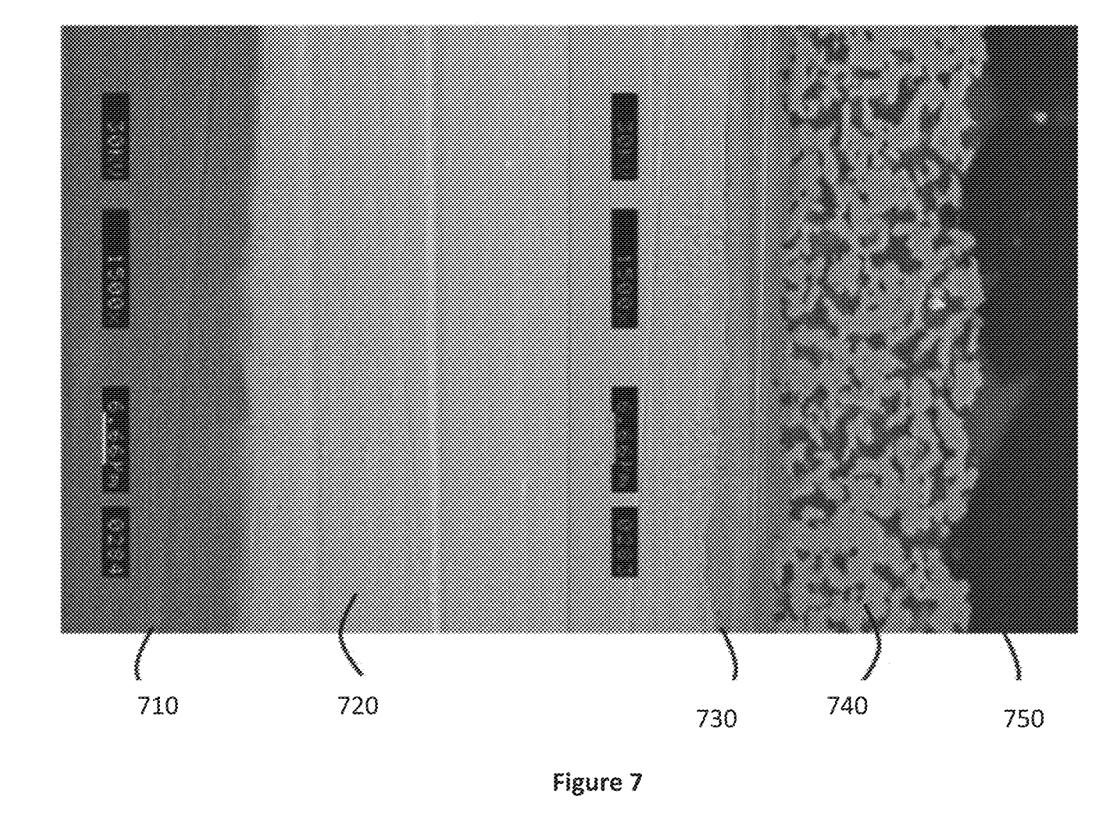
FIG. 7 is a SEM image of a layered joint arrangement for connecting a metal (nickel alloy) to an alumina substrate after the brazing process (prior art).

FIG. 7 illustrates a braze joint with the ceramic substrate made of alumina. Articles made with traditional alumina ceramic (e.g. by a sintered refractory metal powder technique) with Mo/Mn metallization, Nickel electroplating and Nioro® braze do not survive high temperature in an oxidising environment as Mo oxidises causing structural and hermetic failure in the metallization layer.

While not wanting to be bound by theory, it is thought that in the presence of zirconia, a refractory metal (e.g. molybdenum) from the metallization layer 120 goes into solid solution (and may form alloys) with gold and other metals, such as nickel. As zirconia acts as an effective oxygen getter (due to high oxygen vacancy concentration; high oxygen ion diffusivity at elevated temperatures and; in embodiments when exposed to the vacuum or reducing environment heat treatment), it effectively reduces the surface oxide layer on the refractory metal particles thus enabling the refractory metallization layer 120 to diffuse into the gold based braze layer 140. As gold has an extremely low oxygen solubility limit, the refractory metal (and further metals e.g. nickel) are prevented from being oxidized.

In embodiments where the zirconia grains at the interface between the ceramic component 110 and the metallization layer 120 are reduced during the metallization and/or brazing process, the reduced zirconia surface enhances wettability to the metallic braze matrix which results in a strong bond. This phenomenon is thought to contribute to the joint being able to survive higher temperature. It is also postulated that due to higher fracture toughness, the zirconia based ceramic withstands thermal cycling at over higher elevated temperature ranges.

The presence of a further metal in the wetting layer 130 and/or the gold based braze layer 140, such as nickel, may facilitate the diffusion of the refractory metal into the gold based braze material to thereby form the gold rich continuous phase 230 of the brazed joint 215 (e.g. the refractory metal may first form a solid solution with the further metal prior to the refractory metal diffusing into the gold rich phase).

The composition of the further metal may depend upon the composition of the metal component and/or the refractory metallisation layer. The further metal component may comprise nickel, titanium, cobalt, iron, gold, platinum, palladium, aluminium and copper.

The further metal may form a second metallic phase 220. The second metallic phase 220 may be a discontinuous phase. The second metallic phase 220 may be encompassed by the gold rich phase. The second metallic phase may enhance functional performance of the joint. For example, a nickel rich discontinuous phase provides enhanced mechanical properties to the braze matrix.

EXAMPLE 1

YTZ Brazed to Nickel

A feedthrough was made using a ceramic substrate 310 made from yttria stabilised zirconia powder comprising 3 mol % yttria available from Saint Gobain. The ceramic component was first metallized with molybdenum/manganese to form a metallised layer (~15 to 20 μm) equivalent to the metallization layer 120 in FIG. 1. The molybdenum/manganese ink has 45 to 80 wt % Mo, 5 to 25 wt % Mn. The balance is made up of $SiO_2$, $Al_2O_3$, MgO, CaO. The coated ceramic was sintered in a hydrogen furnace between 1350°

C. and 1525° C. The metallized and sintered ceramic was then electroplated with a nickel wetting layer 130 (1.5 to 3 μm) using an electrolytic sulphamate process. The metallized and nickel plated coated ceramic component 115 was subsequently brazed in a vacuum furnace ($10^{-4}$-$10^{-6}$ Torr) furnace between 900 and 1050° C. (2 to 17 minutes hold) with Nioro® (73.8 wt % Au and 26.2 wt % Ni) braze alloy to a Nickel 200 alloy metallic substrate 320.

Figure 3:
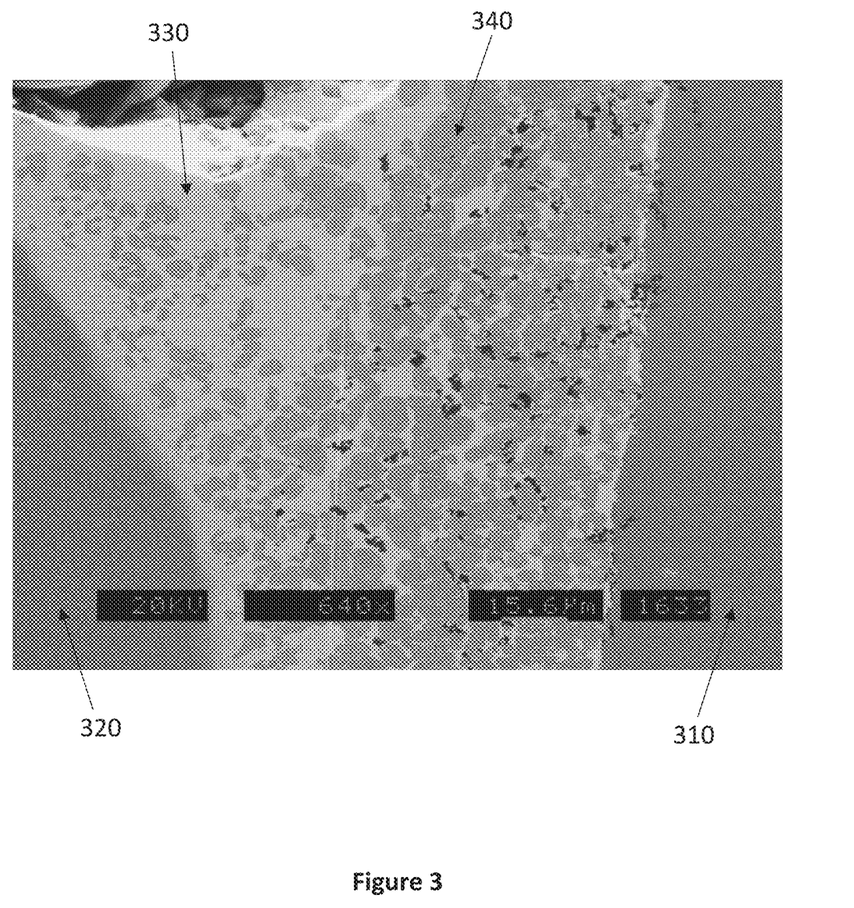
FIG. 3 is a SEM image of a join arrangement for connecting nickel alloy-YSZ after completion of the brazing process.

The resulting article (FIG. 3) comprised a ceramic substrate 310 brazed to a nickel 200 alloy metallic substrate 320 by a continuous gold rich phase (light phase) 330 encompassing a discontinuous nickel rich second metallic phase (dark phase) 340.

Figure 4:
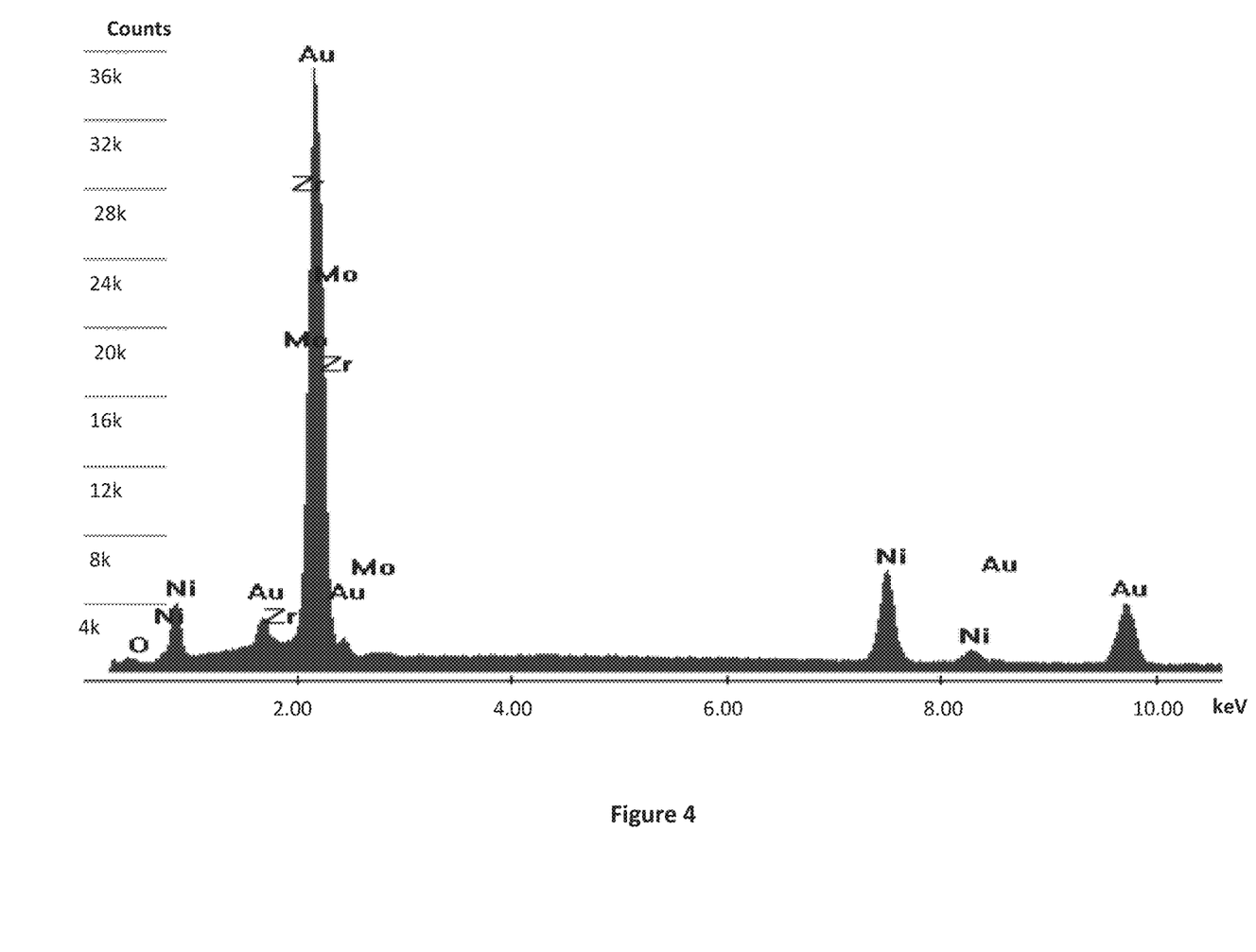
FIG. 4 is an Energy Dispersive Spectroscopy (EDS) spectra of a dark discontinuous phase in FIG. 3.

The EDS spectra (FIG. 4) of the gold rich phase indicates that the phase had a high gold content, with minor portions of manganese, molybdenum, nickel and zirconium.

Figure 5:
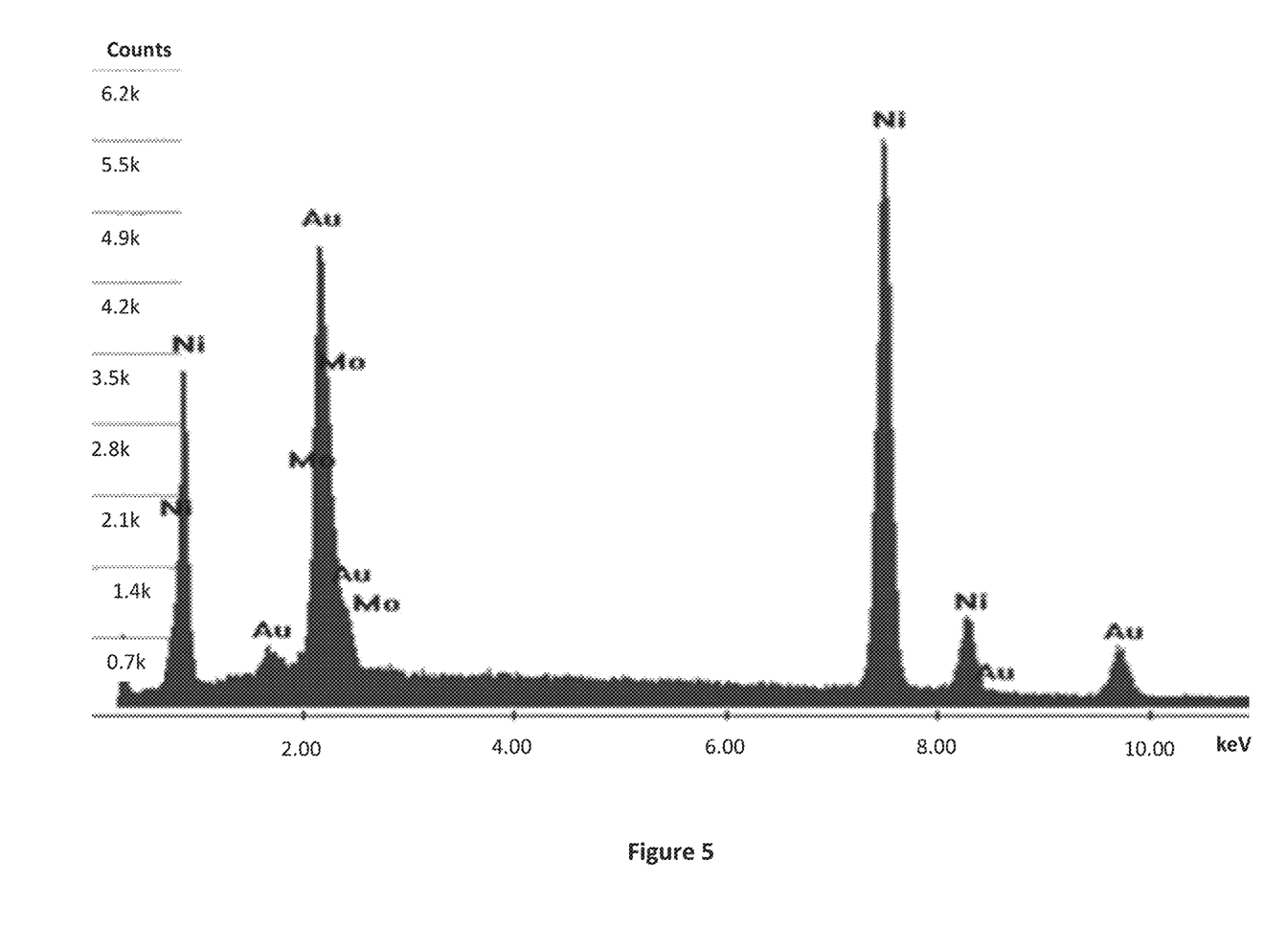
FIG. 5 is an EDS spectra of a light continuous phase in FIG. 3.

The EDS spectra (FIG. 5) of the nickel rich phase indicates that the phase had a high nickel content, minor portions of gold and molybdenum.

The EDS spectra also indicated that gold rich and nickel rich phase had minor quantities of oxygen, with the nickel rich phase having a higher concentration of oxygen than the gold rich phase.

The feedthrough was tested in a thermal cycle test rig where the feedthrough was cycled between a cold box maintained at −65° F. and a hot box maintained at 1250° F. 600 times. The resident time in the cold and hot box was 10 minutes with a 5 minutes hold at room temperature during transfer between boxes. The feedthrough was also held at 1250° F. in an air furnace for 72 hours. The feedthrough was then tested for hermeticity ($<1\times10^{-8}$ L-atm/sec He) and subjected to a torque test (>70 in-lb). The samples passed the required threshold.

The hermeticity was determined in accordance to the protocol of MIL-STD-883 test method 1014 and test condition A4.

The torque resistance was determined by applying a torque to the assembly (typically a concentric arrangement of the ceramic and the metal, where the inner diameter of the metal was joined to the outer diameter of the ceramic). The torque applied to the metal component was gradually increased to the threshold value and beyond. The sample is intermittently examined for failure (hermetic) above the threshold.

The average strength of a braze joint (prior to the thermal shock test) is determined by brazing the two ceramic (of same composition) blocks together (e.g. alumina to alumina or ZTA to ZTA—see Table 1), with an effective bond coverage of 0.25 inch squared. A tensile force is applied to the brazed ceramics (pull test) until failure. The failure force is translated to the joint strength.

Figure 6A:
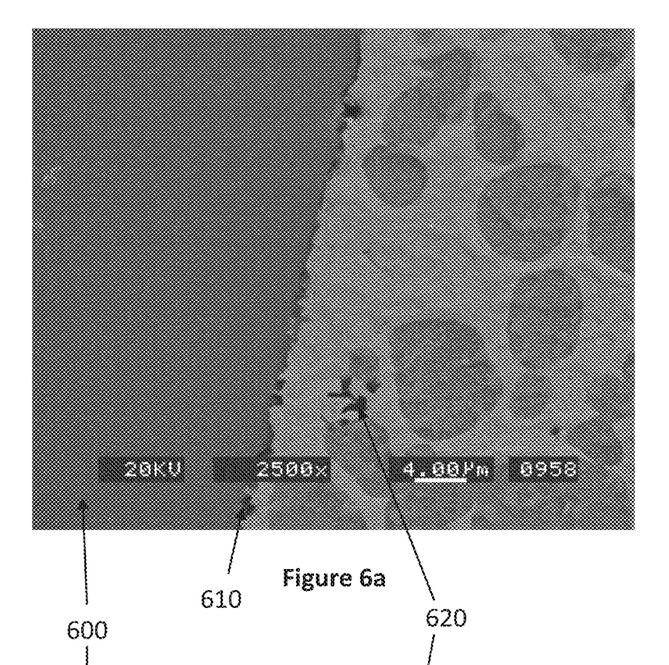
FIGS. 6a & 6b are SEM images of the interface between the YSZ phase as a braze matrix.
Figure 6B:
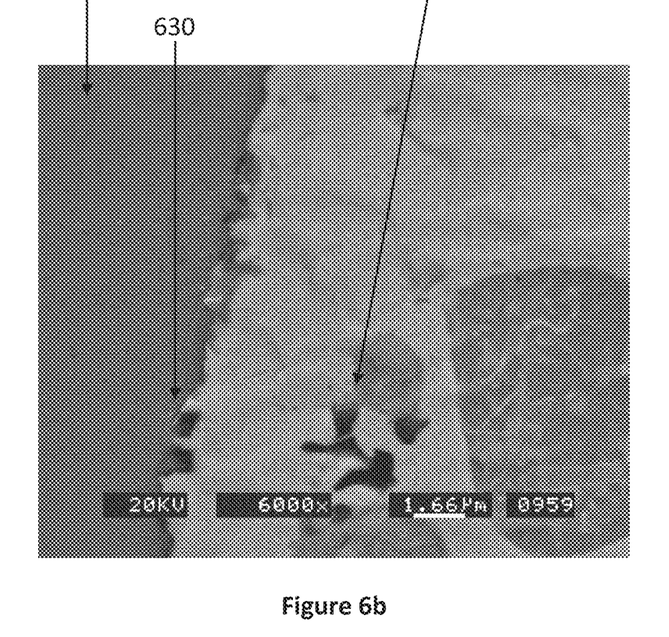

A EDS analysis of the ceramic substrate braze joint interface FIGS. 6a & 6b revealed that the gold rich phase (light phase) interfaced with majority of the substrate 600 surface (e.g. greater than 80%), with the remainder of the interface comprising a glassy phase 610, as indicated by elevated levels of aluminium and oxygen. The glassy phase (darkest phase) was also present within the braze joint 620. An EDS analysis of a zirconium oxide inclusion at the interface 630 indicated that the oxygen level was lower than zirconium oxide within the bulk of the substrate 600.

COMPARATIVE EXAMPLE 1

Alumina Brazed to Nickel

The similar process was used as described in Example 1, but the ceramic was changed from 3 mole % YTZP to alumina (grade AL 950, Morgan Advanced Material), the metallization was obtained by sintering at temperatures between 1450° C. and 1600° C. and vacuum brazing was performed between 1050° C. and 1150° C. (2 to 6 minutes hold). As illustrated in FIG. 7, a nickel substrate 710 is brazed to a alumina substrate 750 with a gold rich braze 720 comprising Nioro® (73.8% Au and 26.2% Ni). The gold rich braze interfaces with the nickel substrate 710 and a nickel wetting layer 730. The nickel wetting layer 730 is electroplated to the molybdenum/manganese metallised layer 740 interfacing the alumina substrate 750.

While the article was hermetic ($<1\times10^{-8}$ L-atm/sec He) after brazing. The article failed the hermeticity and torque tests after the article was subjected to the thermal shock test. In comparison to braze joint of the present disclosure, the molybdenum/manganese metallised layer 740 is prone to oxidation, particularly at evaluated temperatures, and it is thought that the deterioration in performance after the thermal shock test is related thereto. In contrast, in the braze joint of the present disclosure (FIG. 2), the refractory metal (e.g. molybdenum) forms part of the gold rich phase, with the low oxygen solubility in gold protecting the refractory metal from oxidation. Furthermore, the ductile gold rich phase securely interfaces both the ceramic and metal substrates 210, 240 providing a good hermetic seal, even after the thermal shock test.

EXAMPLE 2

ZTA Brazed to Nickel

Figure 8:
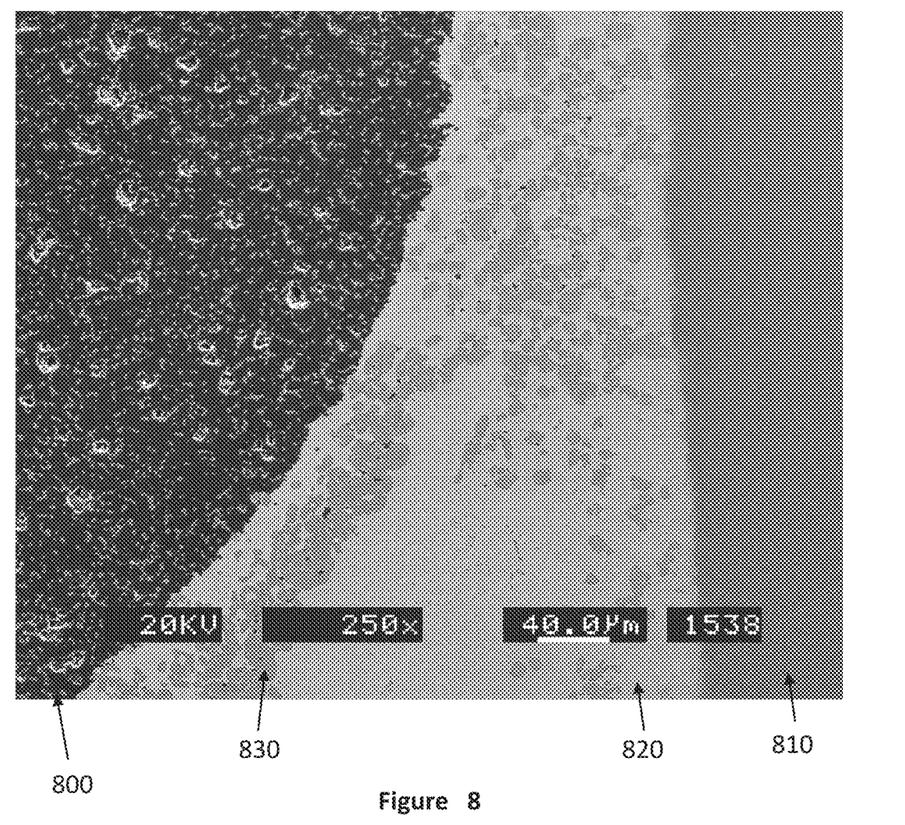
FIG. 8 is an SEM image of a braze joint between zirconia toughened alumina and a nickel alloy.

The braze joint was made using the same method as Example 1, but with the ceramic substrate being zirconia toughened alumina (ZTA). The ZTA grade was Morgan MAC-ZTA20W (20 wt % YTZP, balance alumina). The resultant microstructure (FIG. 8) is similar to that of Example 1, with the ceramic substrate 800 and the nickel alloy substrate 810 jointed together by a braze joint comprising a gold rich continuous phase 820 and the nickel rich discontinuous phase 830.

Figure 9:
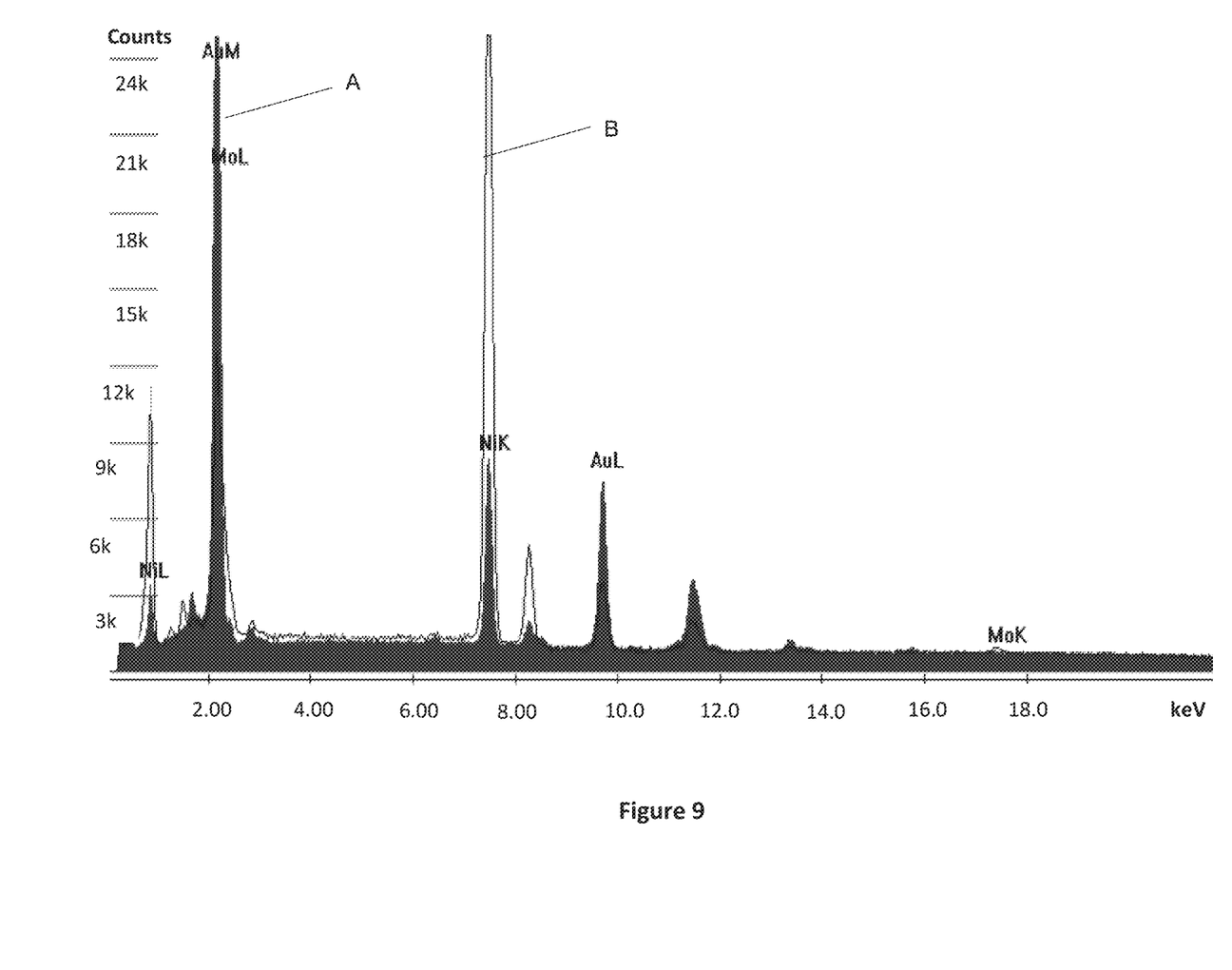
FIG. 9 is an EDS spectra of a light continuous phase (A) and the dark discontinuous phase (B) in FIG. 8.

Composition analysis of the gold rich continuous phase (light phase—label A) and the nickel rich discontinuous phase (dark phase—label B) were derived from the EDS spectrum (FIG. 9) and presented in Tables 1 & 2.

TABLE 1

| Gold rich continuous phase composition (wt. %) | | | |
|---|---|---|---|
| | Ni | Au | Mo |
| 1 | 16.11 | 70.81 | 13.09 |
| 2 | 18.17 | 79.16 | 2.67 |
| 3 | 18.42 | 76.71 | 4.86 |
| Average | 17.57 | 75.56 | 6.87 |

TABLE 2

| Nickel rich discontinuous phase composition (wt. %) | | | |
|---|---|---|---|
| | Ni | Au | Mo |
| 1 | 49.48 | 24.21 | 26.31 |
| 2 | 50.49 | 25.48 | 24.04 |
| 3 | 51.64 | 24.76 | 23.59 |
| Average | 50.54 | 24.82 | 24.65 |

The resulting component was thermally shocked between room temperature and 1250° F. five times. The resident time at each temperature was 30 minutes. The part was also held at 1250° F. in an air furnace for 72 hours. The samples passed the hermeticity as well as torque threshold post the thermal shock tests.

Results

The performance of the articles (Table 3) indicated that the article of the present disclosure was able to withstand the thermal shock test (65° F. or room temperature to 1250° F.) and maintain good hermeticity and torque resistance. In contrast the convention nickel-alumina braze joint failed.

TABLE 3

| Material | Alumina | 3YTZP | ZTA |
|---|---|---|---|
| Example | C-1 | 1 | 2 |
| Failure location | Ceramic body | Ceramic interface | Ceramic body |
| Average strength (MPa) | 41.18 | 48.49 | 53.26 |
| Standard deviation (MPa) | 7.24 | 9.9 | 2.41 |
| Hermeticity post thermal shock ($<1 \times 10^{-8}$ L · atm./sec. He) | Fail | Pass | Pass |
| Torque post thermal shock (>70 in-lb) | Fail | Pass | Pass |

It will be appreciated by the skilled artisan that the present disclosure may be applied to a variety of compositions comprising a gold rich phase combined with a second metallic phase in combination with a zirconia based ceramic substrate. The disclosed method of producing the braze joints enable both excellent wettability of the gold rich phase on the ceramic substrate. The method also produces a gold rich phase which provides oxidation resistance to the second metallic phase to enable the mechanical properties of the second metallic phase to be maintained, even under extreme conditions.

The invention claimed is:

1. An article comprising:
   a. a ceramic substrate comprising a source of zirconium oxide;
   b. a metallic substrate; and
   c. a braze joint disposed between the ceramic substrate and the metallic substrate, wherein the braze joint comprises:
      (i) a gold rich phase interfacing against a surface of the ceramic substrate, said gold rich phase comprises a refractory metal selected from the group consisting of molybdenum, tungsten, niobium, tantalum and combinations thereof; and
      (ii) a second metallic phase comprising a metal selected from the group consisting of nickel, iron, vanadium, cobalt, chromium, osmium, tantalum or combinations thereof, wherein the second metallic phase is encompassed by the gold rich phase.

2. The article according to claim 1, wherein the source of zirconium oxide has the formula:
   $ZrO_{2-x}$ where x is greater than 0.

3. The article according to claim 1, wherein the source of zirconium oxide further comprises yttria, magnesia, scandia, alumina, calcia or ceria.

4. The article according to claim 1, wherein the source of zirconium oxide is selected from the group consisting of zirconia, yttria stabilised zirconia, magnesia stabilised zirconia, scandia stabilized zirconia, calcia stabilised zirconia, ceria stabilised zirconia, alumina toughened zirconia and combinations thereof.

5. The article according to claim 1, wherein the gold rich phase interfaces the ceramic substrate over at least 50% of the ceramic substrate's interfacial area within the braze joint.

6. The article according to claim 1, wherein the second metallic phase comprises at least 35 wt % nickel.

7. The article according to claim 1, wherein the second metallic phase comprises:
   35 wt % to 95 wt % nickel, iron, vanadium, cobalt, chromium, osmium, tantalum or combinations thereof;
   2 wt % to 40 wt % refractory metal selected from the group consisting of molybdenum, tungsten, niobium, tantalum and combinations thereof; and
   0 to 40 wt % gold.

8. The article according to claim 1, wherein the concentration of the gold rich phase is greater at a region of the braze joint proximal to the metallic substrate relative to a region of the braze joint distal to the metallic substrate.

9. The article according to claim 1, wherein the gold rich phase interfaces with the metallic substrate.

10. The article according to claim 1, wherein the concentration of the second metallic phase is greater at a region of the braze joint proximal to the ceramic substrate relative to a region of the braze joint distal to the ceramic substrate.

11. The article according to claim 1, wherein the volumetric ratio of the gold rich phase to the second metallic phase is in the range of 20:70 to 95:5.

12. The article according to claim 1, wherein the volumetric ratio of the gold rich phase to the second metallic phase is in the range of 30:60 to 80:20.

13. The article according to claim 1, wherein the gold rich phase comprises:
   40 wt % to 98 wt % gold;
   2 wt % to 60 wt % refractory metal selected from the group consisting of molybdenum, tungsten, niobium, tantalum and combinations thereof; and
   0 wt % to 50 wt % other compounds.

14. The article according to claim 13, wherein the other compounds comprise one or more of nickel, yttrium, cobalt, platinum, iron, manganese, chromium, zirconium, aluminium, tungsten and vanadium.

15. The article according to claim 1, wherein the metallic substrate comprises one or more of titanium, aluminium, iron, nickel, molybdenum, chrome, cobalt, tungsten, carbon, vanadium, phosphorus, sulphur, silicon, niobium, copper, manganese and alloys thereof.

16. The article according to claim 1, wherein the article is able to maintain a hermeticity of $<1 \times 10^{-8}$ L-atm/sec He; and withstand torque of >70 in-lb after at least 5 thermal shock cycles between −65° F. (−54° C.) or room temperature and 1250° F. (677° C.).

17. The article according to claim 1, wherein:
   (i) the gold rich phase comprises:
      50 wt % to 90 wt % gold;
      2 wt % to 40 wt % refractory metal selected from the group consisting of molybdenum, tungsten, niobium, tantalum and combinations thereof;
      1 wt % to 30 wt % other compounds; and
   (ii) the second metallic phase comprises:
      35 wt % to 70 wt % nickel, iron, vanadium, cobalt, chromium, osmium, tantalum or combinations thereof;
      15 wt % to 40 wt % refractory metal selected from the group consisting of molybdenum, tungsten, niobium, tantalum and combinations thereof; and
      10 wt % to 40 wt % gold.

18. The article according to claim 17, wherein the second metallic phase comprises 40 wt % to 60 wt % nickel; the refractory metal comprises molybdenum; and
   the other compounds comprises nickel.

19. A feedthrough comprising the article as defined in claim 1.

20. An article comprising:
   a. a ceramic substrate comprising a source of zirconium oxide;
   b. a metallic substrate; and
   c. a braze joint disposed between the ceramic substrate and the metallic substrate, wherein the braze joint comprises:
      (i) a gold rich phase interfacing against a surface of the ceramic substrate, said gold rich phase comprises a refractory metal selected from the group consisting of molybdenum, tungsten, niobium, tantalum and combinations thereof; and
      (ii) a second metallic phase comprising a metal selected from the group consisting of nickel, iron, vanadium, cobalt, chromium, osmium, tantalum or combinations thereof, wherein the source of zirconium oxide has the formula:
   $ZrO_{2-x}$ where x is greater than 0.

21. A feedthrough comprising the article as defined in claim 20.

22. An article comprising:
   a. a ceramic substrate comprising a source of zirconium oxide;
   b. a metallic substrate; and
   c. a braze joint disposed between the ceramic substrate and the metallic substrate, wherein the braze joint comprises:
      (i) a gold rich phase interfacing against a surface of the ceramic substrate, said gold rich phase comprises a refractory metal selected from the group consisting of molybdenum, tungsten, niobium, tantalum and combinations thereof; and
      (ii) a second metallic phase comprising a metal selected from the group consisting of nickel, iron, vanadium, cobalt, chromium, osmium, tantalum or combinations thereof, wherein the second metallic phase comprises:
         35 wt % to 95 wt % nickel, iron, vanadium, cobalt, chromium, osmium, tantalum or combinations thereof;
         2 wt % to 40 wt % refractory metal selected from the group consisting of molybdenum, tungsten, niobium, tantalum and combinations thereof; and
         0 to 40 wt % gold.

23. A feedthrough comprising the article as defined in claim 22.

* * * * *